United States Patent [19]

Kaplan

[11] 4,107,543
[45] Aug. 15, 1978

[54] VEHICLE ANTITHEFT SYSTEM

[76] Inventor: Neil B. Kaplan, 63 Mary St., Quincy, Mass. 02169

[21] Appl. No.: 779,478

[22] Filed: Mar. 21, 1977

[51] Int. Cl.² .............................................. B60R 25/10
[52] U.S. Cl. .................................. 307/10 AT; 340/64; 340/545; 180/114
[58] Field of Search ...................... 307/10 AT, 10 R; 340/63, 64, 331, 274, 276; 180/114

[56] References Cited

U.S. PATENT DOCUMENTS 3,997,870  12/1976  Horvath ......................... 307/10 AT Primary Examiner—Herman J. Hohauser
Attorney, Agent, or Firm—Cesari & McKenna

[57] ABSTRACT

A passive vehicle antitheft system utilizes a unique combination of condition responsive switching components to control the access to and use of a vehicle. Primary control over the vehicle is provided by a control relay including a first "protection" position in which the vehicle ignition system and starter are disabled and an alarm system is enabled and a second "use" position in which the ignition system and starter are enabled and the alarm system is disabled. The control relay is in turn controlled by three bistable switching components that are selectively enabled and disabled at various stages of use of the vehicle. The switching components, which in the preferred embodiment comprise a triac, a silicon controlled rectifier, and a second relay, automatically switch the control relay to its "protection" position as an authorized user leaves the vehicle and closes the last vehicle door. The switching components are also interconnected and arranged to provide protection against attempts to tamper with or defeat the system.

13 Claims, 1 Drawing Figure

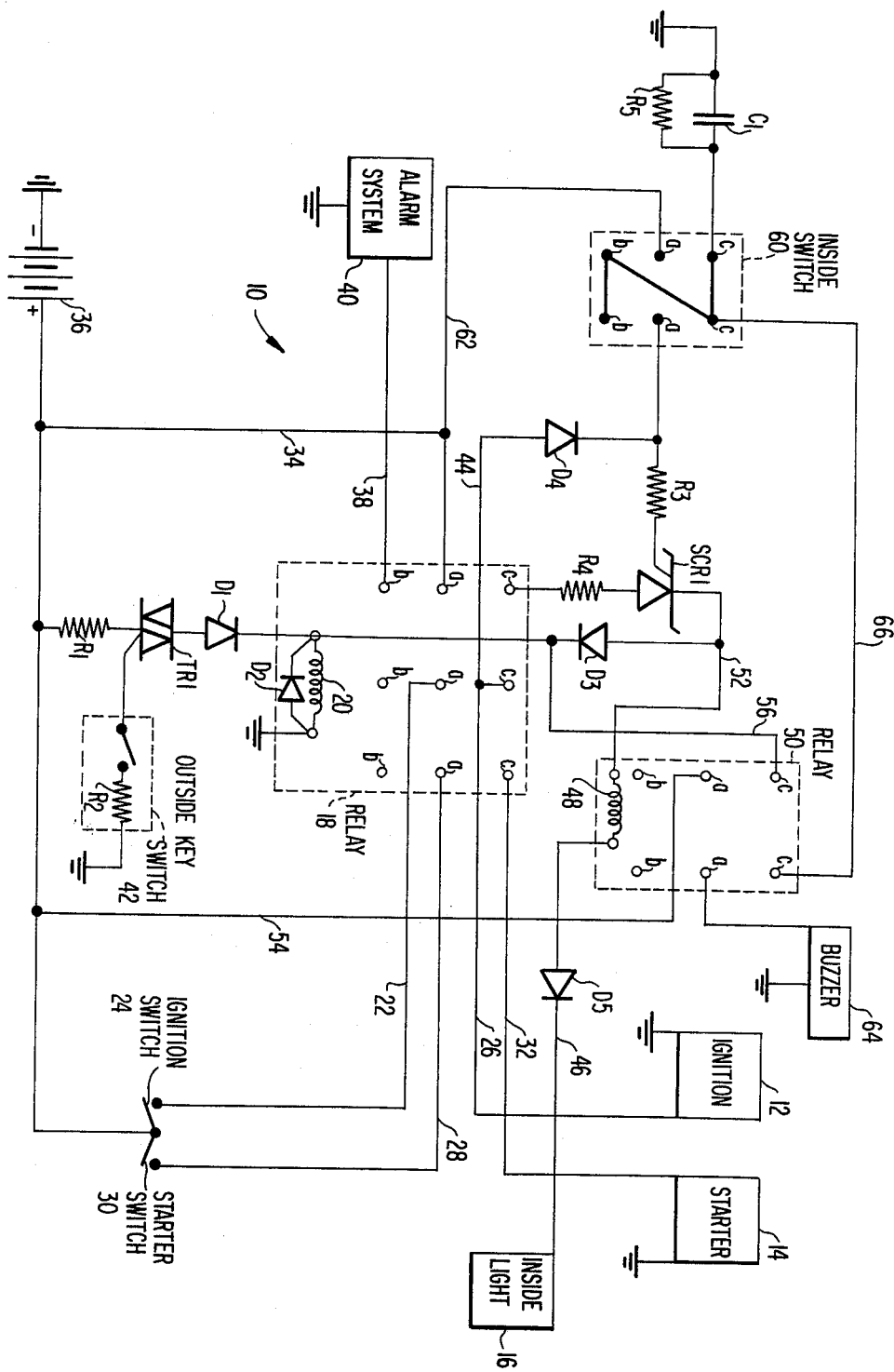

VEHICLE ANTITHEFT SYSTEM

BACKGROUND OF THE INVENTION

This invention relates to a vehicle anti-theft system, and, more particularly, to an anti-theft system that is passive in the sense that it operates automatically when a user leaves the vehicle to protect the vehicle from unauthorized use.

Vehicle thefts, particularly thefts of passenger automobiles, represent a significant crime problem in this and other countries of the world. Many thefts are perpetrated by individuals who simply use the vehicle for a short period of time while others are perpetrated by individuals who take the vehicle for the purpose of realizing a profit from the eventual sale of the vehicle or its parts. In either case, the level of skill of the typical thief has risen to a point where present-day, factory installed vehicle anti-theft equipment is simply not sufficient to present any real obstacle to a taking. As a result, an increasingly large number of vehicle owners are relying upon specially installed anti-theft equipment to provide greater protection against the unauthorized use or loss of their vehicles.

The presently available vehicle anti-theft devices and systems vary widely in complexity, cost and in the amount of protection provided. One of the simplest of such devices is known as an "ignition kill" switch. This switch is typically hidden inside the vehicle and enables a user to disconnect the vehicle ignition system from its source of power, typically the vehicle battery, thereby to prevent the vehicle from being started. Other systems include an alarm or siren that can be set by the user so that an audible alarm will sound if a vehicle door or compartment is opened. Such alarm systems are typically set as the user leaves the vehicle and disabled as the user enters the vehicle using a key switch mounted outside the vehicle. Still other systems combine ignition kill devices with alarms or sirens to discourage both intrusions into and uses of the vehicle.

Although many of these prior systems tend to discourage the unskilled thief, they provide only a minimum amount of resistance to the skilled thief. For example, with the ignition kill switch, a thief, upon realizing that the vehicle will not start, will often search for, find and activate the inside switch to enable the vehicle to be started. Also, those systems that are enabled and disabled by an outside key switch can typically be disabled in one way or another by tampering with the outside switch. This can be accomplished, for example, by cutting, crossing, grounding or applying battery voltage to one or both of the wires extending to the outside key switch. Clearly, if a system can be defeated in such a manner, its effectiveness is greatly diminished.

Additionally, most prior systems are somewhat inconvenient to use because they require some form of positive action by the user upon leaving the vehicle, most typically the activation of the outside key switch, in order to set the system in condition to protect the vehicle. If the user is hurried, or if the vehicle is being left in a location that the user feels is relatively safe, the user will often not take the time or forget to set the system thereby leaving the vehicle unprotected.

Because of the latter problem, some anti-theft systems have been proposed that utilize timers that are activated in response to a typical exiting condition, such as turning the ignition key switch off. After a predetermined period of time has expired, the timer automatically sets the system in condition to protect the vehicle. Timers of this sort not only add to the cost of the systems, but also are inconvenient in that they require that the user fully exit the vehicle in the predetermined period of time. If the user requires more than the predetermined period of time to exit the vehicle because, for example, several passengers are exiting or packages are to be loaded or unloaded, the system must be disabled in order to prevent the sounding of an alarm.

OBJECTS OF THE INVENTION

It is, therefore, a general object of my invention to provide an improved anti-theft system.

Another object of the invention is to provide a vehicle anti-theft system that is passive in that it operates automatically when a user leaves the vehicle to protect the vehicle from unauthorized use.

Another object of the invention is to provide an anti-theft system of the type described that is relatively simple and inexpensive in construction, but that provides a relatively high degree of protection against unauthorized use of the vehicle.

Still another object of the invention is to provide an anti-theft system of the type described that is extremely difficult to bypass or defeat even by relatively skilled individuals.

SUMMARY OF THE INVENTION

Briefly, an anti-theft system embodied in accordance with my invention includes a control device that is connected for controlling use of a vehicle. The control device includes a first position in which the vehicle is disabled and a second position in which the vehicle is enabled. The position of the control device is in turn controlled by a combination of three bistable devices that automatically respond to various conditions of vehicle use.

For example, in an illustrative embodiment of the invention, a first bistable device in the system is enabled by actuation of an outside key switch as a user prepares to enter and use the vehicle. When enabled, the first bistable device switches the control device to its second position to permit use of the vehicle in the normal manner. A second bistable device is enabled when the user starts the vehicle, for example, by closing a vehicle ignition key switch. When enabled, the second bistable device disables the first bistable device but maintains the control device in its second position. A third bistable device is enabled as the user prepares to exit the vehicle, for example, after the ignition key switch is opened and a vehicle door is opened. The third bistable device, when enabled, maintains the control device in its second position. The third bistable device is automatically disabled after the user leaves the vehicle, for example, when the last vehicle door is closed. When disabled, the third bistable device disables the second bistable device and switches the control device back to its first position to prevent use of the vehicle. As a result, the system sets automatically so that no positive action is required as the user leaves the vehicle in order to establish the desired protection.

In a preferred embodiment of the invention, the control device comprises a double-throw, multiple-pole relay switch that in its first position disconnects the vehicle ignition system, starter or the like from a vehicle battery thereby to prevent the vehicle from being started and that in its second position connects these components to the battery in the normal manner to enable the vehicle to be used. The position of the control relay switch is controlled by a relay coil. The first, second and third bistable devices comprise, respectively, a triac, a silicon controlled rectifier and a second relay and are connected to respond to various signals indicative of vehicle use and to selectively energize and de-energize the control relay coil. Because of the unique properties and switching characteristics of the bistable components, the system is inherently difficult to defeat, provides a high degree of protection against the unauthorized use of the vehicle and at the same time provides considerable freedom and flexibility for authorized users.

BRIEF DESCRIPTION OF THE DRAWING

The foregoing and other objects, features and advantages of the invention will be better understood from the following detailed description taken in conjunction of the accompanying drawing in which the sole FIGURE is a partially schematic, partially block diagrammatic illustration of a vehicle anti-theft system embodying the invention.

DETAILED DESCRIPTION OF PREFERRED EMBODIMENT

Referring now specifically to the drawing, a vehicle anti-theft system 10 is shown which embodies my invention and which is particularly adapted for installation within a vehicle such as a passenger automobile of the type including an ignition system 12, a starter 14, and a device such as an inside light 16 which is activated when any one of the vehicle doors is opened. At the heart of the system 10 is a three-pole, double throw relay switch 18 which is controlled by a relay coil 20. The relay switch 18 has two possible positions: a first position in which each of the three terminal pairs a-b therein are interconnected and a second position in which each of the three terminal pairs a-c therein are interconnected. The relay coil 20 controls the relay switch 18 so that when the coil 20 is de-energized, the terminal pairs a-b are interconnected and when the coil 20 is energized, the terminal pairs a-c are interconnected.

The center terminal a in the switch 18 connects by a line 22 to a vehicle ignition switch 24 which is typically a key-operated switch mounted on the steering column or dashboard of the vehicle. The center terminal c in the switch 18 connects by a line 26 to the power input side of the ignition system 12. When the center terminals a-c are interconnected in the switch 18, the ignition system 12 can be activated by the ignition switch 24 in the normal manner. When they are disconnected, the ignition system 12 cannot be actuated. The ignition system 12 is thus enabled when the relay coil 20 is energized and is disabled when the relay coil 20 is de-energized.

Similarly, the right side terminal a in the switch 18 connects by a line 28 to a starter switch 30 which in the typical vehicle is operated by the same key that operates the ignition switch 24. The right side terminal c in the switch 18 connects by a line 32 to the power input side of the starter 14. Thus, when the right side terminals a-c are interconnected, the starter 14 is enabled and when they are disconnected, the starter 14 is disabled. The starter 14 is thus also enabled by energization of the relay coil 20 and disabled by de-energization of coil 20.

The left side terminal a in the switch 18 is connected by a line 34 to a battery 36 which provides general power to the vehicle electrical system. The left side terminal a in the switch 18 is thus maintained at the vehicle battery voltage (e.g., +12.6 volts DC).

The left side terminal b in the switch 18 connects by a line 38 to the power input side of a voltage drop alarm system 40. The alarm system 40 is of a conventional, commercially available design which connects into the vehicle electrical system and which, when enabled, will sound an audible or other alarm in reponse to a voltage drop in the electrical system. The system 40 will respond to voltage drops that result when, for example, a vehicle door is opened and the light 16 is lit, the vehicle trunk is opened and a light inside the trunk is lit, the vehicle glove box is opened and a light inside the glove box is lit, the vehicle lights are turned on, or the vehicle brakes are applied. The alarm system 40 is also typically arranged so that it induces a voltage drop and is triggered when the hood covering the vehicle engine compartment is opened. The alarm system 40 will thus sound its alarm in response to any of a wide variety of unauthorized intrusions into the vehicle and its compartments.

As can be appreciated from the drawing, the alarm system 40 is enabled only when the relay coil 20 is de-energized (i.e., when the left side terminals a-b are interconnected). When the relay coil 20 is energized, the alarm system 40 cannot be triggered to sound its alarm.

An outside key switch 42 is connected into the system 10 which allows authorized users to enter and use the vehicle without sounding the alarm. The key switch 42 is typically mounted in a convenient location outside the vehicle such as in a fender on the driver's side of the vehicle. The switch 42 may, for example, be an ace switch of the type conventionally used in alarm systems which is activated using a corresponding key. The switch 42 typically includes a stable open position and a stable closed position which is achieved by turning the key in the switch 42 one-quarter turn from its open position.

It is assumed initially that the system 10 is in its "protection" mode; that is, the relay coil 20 is de-energized, the ignition system 12 is disabled, the starter 14 is disabled and the alarm system 40 is enabled. In this mode, any unauthorized intrusion into the vehicle will cause the alarm system 40 to sound its alarm. Additionally, even if access is gained to the outside of the vehicle in spite of the alarm, use of the vehicle is prevented because the ingition system 12 and starter 14 are disabled.

In order for an authorized user to gain access to the vehicle, the key switch 42 is activated to its closed position for a moment and then returned back to its open position. When the key switch 42 is closed, a current path is provided through the gate electrode of a triac TR1. The triac TR1 is thus enabled and current flows from the battery 36 through a resistor R1, the triac TR1 and a diode D1 to the relay coil 20. With the switch 42 closed, however, the current flow through the triac TR1 is insufficient to energize the relay coil 20. When the switch 42 is again opened, the current through the triac TR1 increases to a level sufficient to energize the coil 20. The coil 20 thus activates the relay switch 18 to interconnect the terminal pairs a-c therein. The system 10 switches to its "use" mode in which the ignition system 12 and starter 14 are enabled and the alarm system 40 is disabled. The left side terminal pairs a-c in the switch 18 also connect the battery 36 through the line 34 to a resistor R4 which is connected to the cathode of a gate controlled (e.g., silicon controlled)

rectifier SCR1. The triac TR1 continues to conduct sufficient current to maintain the system 10 in its "use" mode until the voltage on the anode side of the triac TR1 is brought up to the level of the voltage on the cathode side of the triac TR1.

In the "use" mode, the user is free to enter the vehicle or any of its compartments without triggering the alarm system 40. Additionally, the user may start and drive the vehicle since both the ignition system 12 and starter 14 are enabled.

Once the user is in the vehicle, he activates the ignition switch 24 in preparation for starting the vehicle's engine. As indicated in the drawing, the center terminal c in the switch 18 is also connected by a line 44 including a diode D4 and a resistor R3 to the gate of the rectifier SCR1. When the system 10 is in its "use" mode and the ignition switch 24 is closed, a current path is provided from the battery 36 through the center terminal pair a-c in the switch 18 and to the gate of the rectifier SCR1. The rectifier SCR 1 is thus enabled and current flows from the battery 36 through the line 34, the left side terminal pair a-c in the switch 18, the rectifier SCR1 and a diode D3 to the relay coil 20. This has the effect of increasing the voltage on the anode side of the triac TR1 sufficiently to turn the triac TR1 off. The relay coil 20, however, remains energized due to the current flow through the rectifier SCR1 and diode D3. The system 10 thus remains in its "use" mode as long as the rectifier SCR1 continues to conduct.

After the vehicle is driven to its destination, it is typically parked and the ignition key switch 24 is opened. To exit the vehicle, the user opens a vehicle door and the light 16, which is typically a dome light mounted inside the vehicle, is lit. As indicated in the drawing, the light 16 is connected into the system 10 by a line 46 including a diode D5. The line 46 is connected to the light 16 in such a manner that it is grounded when the light 16 is "on" and at a positive voltage when the light 16 is "off". The opposite end of the line 46 connects to one end of a relay coil 48 in a two-pole, double throw relay switch 50 including a right and a left side terminal group a-b-c.

The opposite end of the relay coil 48 in the relay switch 50 is connected by a line 52 to the anode of the rectifier SCR1. When the coil 48 is de-energized, the terminal pairs a-b in the relay switch 50 are interconnected. Energization of the coil 48 causes the terminal pairs a-c to be interconnected.

The relay coil 48 is energized only when two conditions are met: first, the rectifier SCR1 is conducting; and, second, the line 46 is grounded. Thus, as the user opens the vehicle door in preparation for leaving the vehicle and the light 16 is lit, the relay switch 50 switches to interconnect the terminal pairs a-c therein. A current path is thereby provided from the battery 36 through a line 54, the left-side terminal pair a-c in the switch 50 and a line 56 to the relay coil 20 in the switch 18. Thus, as long as a door is kept open, the system is maintained in its "use" mode by the current flowing from the battery 36 through the relay switch 50.

As soon as the last door in the vehicle is closed, the light 16 goes out, the line 46 returns to a positive voltage causing the relay switch 50 to switch back to its original position. The current flow through the switch 50 thus stops and, because the ignition switch 24 is open, the rectifier SCR1 is turned off. The relay coil 20 is then de-energized and the relay switch 18 switches the system 10 back to its "protection" mode. The system 10 thus automatically reassumes its "protection" mode as soon as the user leaves the vehicle. There is no need to activate the outside key switch 42 or any other switch in the system 10 upon leaving.

The diode D5 in the line 46 prevents reverse current from flowing from the light 16 to the coil 48.

When the system 10 is in its "use" mode and the ignition switch 24 is closed, any of the doors of the vehicle may be opened or closed at will without affecting the automatic reset feature of the system 10. This is because the relay switch 50 cannot turn the rectifier SCR1 off when the ignition switch 24 is closed. Thus, as long as the switch 24 is closed, the rectifier SCR1 will the keep relay coil 20 energized in spite of the condition of the vehicle doors.

When the system 10 is in its "protection" mode and a door is opened to gain access to the vehicle, the alarm system 40 is triggered and will sound its alarm. This does not energize the relay coil 48 because the rectifier SCR1 is disabled. The rectifier SCR1 is disabled because the relay switch 18 in the "protection" mode disconnects the cathode of the rectifier SCR1 from its source of power, the battery 36. Thus, when a door is opened while the system 10 is in its "protection" mode, the relay switch 50 will not conduct and the system remains in its "protection" mode.

It is possible for an unauthorized user to enter the vehicle without opening a door, for example, by breaking a window and entering through the broken window. Even if access is gained in this manner, the system 10, if in its "protection" mode, prevents unauthorized use of the vehicle because the ignition system 12 and starter 14 are disabled. Additionally, as soon as the user steps on the vehicle brakes or opens the glove box or does any other action that induces a voltage drop in the vehicle electrical system, the alarm system 40 will be triggered to sound its alarm.

All component parts of the system 10, with the exception of an inside switch 60 to be described below, are preferably located within the engine compartment of the vehicle and suitably protected from tampering (e.g., in a protective enclosure). Thus, even if access is gained to the inside of the vehicle without triggering or in spite of the alarm system 40, the system 10 cannot be defeated from that location.

The outside key switch arrangement in the system 10 is also inherently difficult to defeat. In order for the triac TR1 to conduct current to the relay coil 20, not only must a gate current path be provided, but also the resistance of that path must be of the proper level. For this reason, a resistor R2 is connected in series with the outside key switch 42. Preferably, as indicated in the drawing, the resistor R2 is actually built into the key switch 42 itself. The resistor R2 is matched to the triac TR1 so that, when the outside key switch 42 is closed, the proper path resistance is provided to enable the triac TR1 to start conducting battery current. As a result of this arrangement, any attempt to defeat the system 10 by crossing, cutting, grounding or applying battery voltage to either or both of the wires extending into the key switch 42 will fail since the triac TR1 will not be enabled by any such action. In fact, the only way to switch the system 10 out of its "protection" mode by tampering with the outside key switch 42 is to ground the wire extending to the triac TR1 through a resistor equal in value to the resistor R2.

Also in this repeat, it has previously been noted that the triac TR1 is such that, although it starts conducting battery current when the key switch 42 is closed, it does not conduct sufficient current to energize the relay coil 20 until the key switch 42 iagain opened. Thus, if an unauthorized user should happen to obtain the key to the key switch 42, or a master key, or is able to "pick" the key switch 42, the user must still know enough to close and then again open the key switch 42 in order to switch the system 10 out of its "protection" mode.

The inside switch 60 mentioned above is arranged to enable the user to temporarily deactivate the system 10 when, for example, the vehicle and ignition key are to be left with a parking or garage attendant and also to enable the user to open and close the vehicle doors without activating the ignition switch 24 when, for example, something is to be removed from or placed into the vehicle. The switch 60, which is preferably installed inside the vehicle so as to be within the reach of the driver, may comprise a three-position toggle switch including a stable center position in which none of the terminal pairs therein are interconnected, a first side position which is stable and in which the terminal pairs a-c are interconnected and a second side position which is unstable or monmentary and in which the terminal pairs a-b are interconnected.

When the switch 60 is in its center position, the system 10 operates in its normal manner as described above. It is assumed, however, that the system 10 is in its "use" mode, the user is in the vehicle and would like to temporarily prevent the system 10 from returning to its "protection" mode as he leaves. This can be accomplished by moving the switch 60 to its first side position prior to opening any of the vehicle doors. The terminal pairs a-c in the switch 60 are thus each interconnected and the gate of the rectifier SCR1 is directly connected to the battery 36 by a line 62 and the line 34. The rectifier SCR1 can thus not be turned off by the relay switch 50 when any of the vehicle doors is opened and then closed. As long as the switch 60 is left in its first side position, the rectifier SCR1 continuously supplies current to the relay coil 20 to maintain the system 10 in its "use" mode. The vehicle can thus be started and driven and any of its doors or other compartments can be opened or closed without triggering the alarm system 40.

To remind the user that the system 10 has been so disabled, a buzzer 64 is activated whenever the switch 60 is in its first side position and any one of the vehicle doors is open. A line 66 is included which connects the right side terminal c in the inside switch 60 to the right side terminal c in the relay switch 50. Thus, when a door is opened the light 16 is lit and the relay coil 48 is energized, current is coupled from the battery 36 through the inside switch 50 and the rlay switch 50 to the buzzer 64. The buzzer 64 will continually sound as long as a door is open and the switch 60 is in its first side position. The buzzer 64 is disabled and the system 10 is returned to its automatic operating mode by moving the switch 60 back to its center position.

It is now assumed that the system is in its "protection" mode and the user is outside of the vehicle and would like to open and close one of the vehicle doors without starting the vehicle. The user must activate the outside key switch 42 prior to opening the door to enable the triac TR1 and to disable the alarm system 40. The user may then open the door and reach into or enter the vehicle. He may, in fact, open and close the door as many times as desired since the triac TR1 will maintain the system 10 in its "use" mode. When leaving the vehicle, prior to closing the last door, the user moves the switch 60 to its second side position to momentarily interconnect the terminal pairs a-b therein. This has the effect of applying battery voltage to the gate of the rectifier SCR1 which enables it to conduct and turn off the triac TR1 in the same way that the triac TR1 is turned off when the ignition switch 24 is closed. With the door opened, the system 10 is kept in its "use" mode by the relay switch 50. As soon as the door is shut, however, the current through the relay switch 50 stops and the system 10 automatically returns to its "protection" mode. It is noted that the buzzer 64 also sounds during the short period in which the user holds the switch 60 in its second side position.

In many instances, thieves, after gaining access to the inside of a vehicle, will search for an inside switch that they hope will enable them to deactivate any alarm or antitheft system and use the vehicle. If the system 10 is in its "protection" mode and a thief should happen to gain access to the vehicle without triggering the alarm system 40, find the switch 60 and move it from its center position to either of its side positions, such action will induce a voltage drop through a capacitor C1 and resistor R5 sufficient to trigger the alarm system 40. Such action also will not be effective in switching the system 10 out of its "protection" mode. For this reason, there is no need to hide the inside switch 60. In fact, the inside switch 60 might intentionally be left in plain view to invite tampering by a thief who has successfully broken into the vehicle so that, by his tampering, he may unknowingly trigger the alarm system 40.

The operation of the remaining components in the system 10 is standard and will be appreciated by those skilled in the art. For example, the diodes D1, D3 and D4 are switching diodes of the type conventionally used with solid-state switching components such as the triac TR1 and rectifier SCR1. The diode D2 is a clamping diode which enables the relay coil 20 to rapidly dissipate current after it is de-energized.

Further illustrative characteristics of the various components in the system 10 of the drawing are as follows:

| COMPONENT | DESCRIPTION |
| --- | --- |
| R1 | 15 ohm resistor |
| R2 | 33 ohm resistor |
| R3 | 1 K ohm resistor |
| R4 | 10 ohm resistor |
| R5 | 2 K ohm resistor |
| D1–D5 | 1N914/4148 switching diodes |
| C1 | 200 Microfarad capacitor |
| TR1 | 50 volt/6 amp triac |
| SCR1 | 40 amp/sensitive gate rectifier |

In summary, it can be appreciated from the above description that the vehicle anti-theft system 10 is relatively simple and inexpensive in construction and simple to install and use, yet still provides a high degree of protection to the vehicle. The system 10 is passive in that it also automatically resumes its "protection" mode when the last door of the vehicle is closed. The user does not have to rely upon his memory each time he leaves the vehicle to establish the desired protection. The only thing the user should remember is to actuate the outside key switch 42 upon entering the vehicle. Even if this is forgotten, the user is reminded by the sounding alarm system 40 as he opens the door which is then disabled by the actuation of the outside key switch 42.

The switch 10 also provides a high degree of protection against unauthorized use of the vehicle and against all types of unauthorized intrusions into its compartments. Moreover, because of the unique operation of the system 10, it is extremely difficult for even highly skilled individuals to by-pass or defeat.

It should be understood that the above-described embodiment is intended to illustrate rather than limit my invention and that numerous modifications can be made thereto without departing from the scope of my invention as defined by the appended claims. Clearly, not all of the components shown in the drawing are essential to the system 10. For example, the alarm system 40, the inside switch 60 and the buzzer 64, though desirable, could be omitted without affecting the basic operation of the system 10. The three-pole, double-throw relay switch 18 could also be replaced by a simpler, more inexpensive switching component that controls only the vehicle ignition system 12. On the other hand, the system 10 can be readily modified to include additional components and features. For example, the relay switch 18 may be used to control an electrical valve, such as a solenoid valve, that cuts off the supply of fuel to the vehicle engine when the system 10 is in its "protection" mode. The relay switch 18 may also be used to control the vehicle fuel gauge so that, when the system 10 is in its "protection" mode, the gauge indicates that the vehicle is out of fuel, thus discouraging intruders from tampering with or damaging the vehicle. Fuel system controls of this type may be used in addition to or in lieu of the control the switch 18 provides over the ignition system 12 and starter 14.

The outside key switch 42 in the system 10 that enables a user to enter the vehicle may also be replaced by another type of switch such as a magnetically operated proximity switch that closes when a magnetic "key" is placed near it and that opens when the magnetic "key" is moved away. A magnetic switch of this type could be completely concealed within a portion of the vehicle body.

Additionally, devices other than the door actuated light 16 and the relay switch 50 may be used to control the rectifier SCR1 and relay coil 20 so that the system 10 automatically returns to its "protection" mode as the user leaves the vehicle. If, for example, there is no door actuated light 16 in the vehicle, a simple door switch may be installed to serve the same purpose. Alternatively, a pressure sensitive seat switch or another similar device may be used together with a suitable timer to provide the exiting control.

It should also be noted that the word "vehicle" in the foregoing description and in the appended claims is used in a broad sense since the system 10 can be used with all types of road vehicles as well as rail, water and air vehicles. The system 10 can also be used with vehicles powered by electric motors.

Other modifications will be obvious to those skilled in the art upon reading the foregoing description. It is thus the object of the appended claims to cover all modifications as come within the true spirit and scope of the invention.

What I claim is:

1. A passive anti-theft system for preventing the unauthorized use of a vehicle, the vehicle including at least one door for entering and exiting the vehicle, said system comprising:

A. switchable control means for controlling use of the vehicle, said switchable control means including a first position in which use of the vehicle is prevented and a second position in which use of the vehicle is enabled, said switchable control means normally being in said first position thereby to prevent use of the vehicle;

B. means actuatable by an authorized user prior to using the vehicle for switching said switchable control means to its second position thereby to enable use of the vehicle; and C. automatic arming means responsive to the closing of the vehicle door when the user exits the vehicle for switching said switchable control means back to its first position thereby to again prevent use of the vehicle, whereby said system is automatically armed and the vehicle is automatically protected upon the closing of the vehicle door without the need for any additional action on the part of the user.

2. A system as recited in claim 1 in which the vehicle is of the type including ignition switch means for activating and deactivating a vehicle engine in which said user actuatable means includes first bistable means that is enabled in response to actuation of said user actuatable means to switch said switchable control means to its second position thereby to permit use of the vehicle, and in which said automatic arming means includes second bistable means that is enabled in response to activation of the ignition switch means to disable said first bistable means and to maintain said switchable control means in its second position, and third bistable means that is enabled in response to deactivation of the ignition switch means and to the opening of the vehicle door to disable said second bistable means and to maintain said switchable control means in its second position, said third bistable means being disabled in response to the closing of the vehicle door to switch said switchable control means back to its first position thereby to prevent use of the vehicle.

3. A system as recited in claim 2 in which the vehicle is of the type including an inside light that is energized when the vehicle door is opened and de-energized when the vehicle door is closed and in which said third bistable means is enabled by the energization of the inside light and disabled by the de-energization of the inside light.

4. A system as recited in claim 2 in which the vehicle is of the type further including a battery, in which the ignition switch means includes ignition means powered by the battery and in which said switchable control means in its first position disconnects the ignition means from the battery to disable the vehicle and in its second position connects the ignition means to the battery to enable the vehicle.

5. A system as recited in claim 2 in which the vehicle is of the type further including a battery, in which the ignition switch means includes an engine starter powered by the battery and in which said switchable control means in its first position disconnects the starter from the battery to disable the vehicle and in its second position connects the starter to the battery to enable the vehicle.

6. A system as recited in claim 1 further including

D. means for sounding an alarm in response to intrusions into the vehicle, said alarm means being enabled when said switchable control means is in its first position and disabled when said switchable control means is in its second position.

7. A system as recited in claim 2 further including
E. switch means mounted inside the vehicle for enabling said second bistable means independently of the activation of the ignition switch means.

8. A system as recited in claim 2 in which said user actuatable means comprises a switch mounted outside the vehicle and including an open and closed position and in which said first bistable means is enabled in response to the closing and then opening of said outside switch.

9. A system as recited in claim 2 in which said switchable control means comprises a relay switch and a relay coil for controlling said relay switch, said relay switch being movable between its first and second positions in response to the energization and de-energization, respectively, of said coil by any one of said first, second and third bistable means.

10. A system as recited in claim 2 in which said second bistable means can be enabled only when said switchable control means is in its second position and in which said third bistable means can be enabled only when said second bistable means is enabled.

11. A system as recited in claim 10 in which said first bistable means comprises a triac, in which said second bistable means comprises a silicon controlled rectifier and in which the third bistable means comprises a relay switch.

12. An anti-theft system for preventing the unauthorized use of a vehicle of the type including one or more doors for entering and exiting the vehicle, means for activating and deactivating a vehicle engine, and a battery for powering the engine activating means, said system comprising:
A. means for controlling use of the vehicle by controlling the power to the engine activating means, said control means including a first position in which the engine activating means is disconnected from the battery and a second position in which the engine activating means is connected to the battery;
B. switch means mounted outside the vehicle and actuatable by a user prior to entering and using the vehicle;
C. first bistable means for controlling said control means, said first bistable means being enabled in response to the actuation of said outside switch means to switch said control means to its second position thereby to permit use of the vehicle;
D. second bistable means for controlling said control means, said second bistable means being enabled when said control means is in its second position and in response to the activation of the engine activating means to disable said first bistable means and to maintain said control in its second position; and
E. third bistable means for controlling said control means, said third bistable means being enabled when said second bistable means is enabled and in response to the deactivation of the engine activating means and to opening of a vehicle door to disable said second bistable meand and to maintain said control means in its second position, said third bistable means being disabled in response to closing of the vehicle door to switch said control means to its first position and thereby prevent use of the vehicle.

13. A system as recited in claim 12 in which said control means comprises a relay switch and relay coil, said relay switch being in its first position when said relay coil is de-energized and in its second position when said relay coil is energized, in which said first bistable means comprises a triac having a gate connected to said outside switch means, a cathode connected to the battery and an anode connected to said relay coil, in which said second bistable means comprises a silicon controlled rectifier having a gate connected to the engine activating means, a cathode connected to the battery when said control means is in its second position, and an anode connected to said relay coil, and in which said third bistable means comprises a second relay switch which is responsive to opening and closing of the vehicle door, said second relay switch having a terminal connected to the relay coil of said control means.

* * * * *

UNITED STATES PATENT AND TRADEMARK OFFICE
CERTIFICATE OF CORRECTION

PATENT NO. : 4,107,543
DATED : AUGUST 15, 1978
INVENTOR(S) : NEIL B. KAPLAN

It is certified that error appears in the above-indentified patent and that said Letters Patent is hereby corrected as shown below:

Column 11, line 18
Claim 9, line 5, "energization and de-energization" should read --de-enerization and energization--.
Column 15, line 21
Claim 12, line 34, "meand" should read --means--.

Signed and Sealed this

Nineteenth Day of November, 1996

Attest:

BRUCE LEHMAN

Attesting Officer

Commissioner of Patents and Trademarks

REEXAMINATION CERTIFICATE (3006th)
United States Patent [19]
Kaplan

[11] B1 4,107,543
[45] Certificate Issued Oct. 1, 1996

[54] VEHICLE ANTITHEFT SYSTEM

[75] Inventor: Neil B. Kaplan, Quincy, Mass.

[73] Assignee: TSI Security Acquisition Corp., Deerfield Beach, Fla.

Reexamination Request:
No. 90/003,997, Oct. 19, 1995

Reexamination Certificate for:
Patent No.: 4,107,543
Issued: Aug. 15, 1978
Appl. No.: 779,478
Filed: Mar. 21, 1977

[51] Int. Cl.⁶ .................................. B60R 25/10
[52] U.S. Cl. ............... 307/10.4; 180/287; 307/10.2; 340/428; 340/545

[56] References Cited

U.S. PATENT DOCUMENTS

| | | | |
|---|---|---|---|
| 2,594,196 | 4/1952 | Moledzky | 180/287 |
| 3,199,033 | 8/1965 | Atkins et al. | |
| 3,200,304 | 8/1965 | Atkins | |
| 3,200,305 | 8/1965 | Atkins et al. | |
| 3,200,306 | 8/1965 | Atkins et al. | |
| 3,255,380 | 6/1966 | Atkins et al. | |
| 3,275,897 | 9/1966 | Atkins et al. | |
| 3,314,081 | 4/1967 | Atkins et al. | |
| 3,339,212 | 9/1967 | Atkins et al. | |
| 3,382,408 | 5/1968 | Atkins et al. | |
| 3,435,298 | 3/1969 | Atkins et al. | |
| 3,492,542 | 1/1970 | Atkins et al. | |
| 3,508,120 | 4/1970 | Atkins et al. | |
| 3,551,753 | 12/1970 | Atkins | |
| 3,553,525 | 1/1971 | McGuirk | |
| 3,555,368 | 1/1971 | Atkins et al. | |
| 3,564,346 | 2/1971 | Atkins | |
| 3,568,005 | 3/1971 | Atkins | |
| 3,568,006 | 3/1971 | Atkins | |
| 3,569,728 | 3/1971 | Atkins | |
| 3,571,666 | 3/1971 | McGuirk, Jr. | |
| 3,585,584 | 6/1971 | Behrend | 340/430 |
| 3,593,273 | 7/1971 | Teich | |
| 3,639,897 | 2/1972 | Teich | |
| 3,649,849 | 3/1972 | McGuirk, Jr. | |
| 3,671,934 | 6/1972 | Teich | |
| 3,712,730 | 1/1973 | Florsheim, Jr. et al. | |
| 3,723,967 | 3/1973 | Atkins et al. | |
| 3,740,567 | 6/1973 | Atkins | |
| 3,740,713 | 6/1973 | Teich | |
| 3,777,180 | 12/1973 | Carlson | |
| 3,781,854 | 12/1973 | Kaufman et al. | |

(List continued on next page.)

FOREIGN PATENT DOCUMENTS

| | | |
|---|---|---|
| 1451007 | 11/1966 | France. |
| 2209342 | 6/1974 | France. |
| 2219654 | 9/1974 | France. |
| 2223215 | 10/1974 | France. |
| 2231213 | 12/1974 | France. |
| 2303332 | 10/1976 | France. |
| 2363479 | 12/1973 | Germany. |
| 670828 | 4/1952 | United Kingdom. |
| 1139113 | 1/1969 | United Kingdom. |
| 1350705 | 4/1974 | United Kingdom. |
| 1357262 | 6/1974 | United Kingdom. |

*Primary Examiner*—William M. Shoop, Jr.
*Attorney, Agent, or Firm*—Clifford A. Poff

[57] ABSTRACT

A passive vehicle antitheft system utilizes a unique combination of condition responsive switching components to control the access to and use of a vehicle. Primary control over the vehicle is provided by a control relay including a first "protection" position in which the vehicle ignition system and starter are disabled and an alarm system is enabled and a second "use" position in which the ignition system and starter are enabled and the alarm system is disabled. The control relay is in turn controlled by three bistable switching components that are selectively enabled and disabled at various stages of use of the vehicle. The switching components, which in the preferred embodiment comprise a triac, a silicon controlled rectifier, and a second relay, automatically switch the control relay to its "protection" position as an authorized user leaves the vehicle and closes the last vehicle door. The switching components are also interconnected and arranged to provide protection against attempts to tamper with or defeat the system.

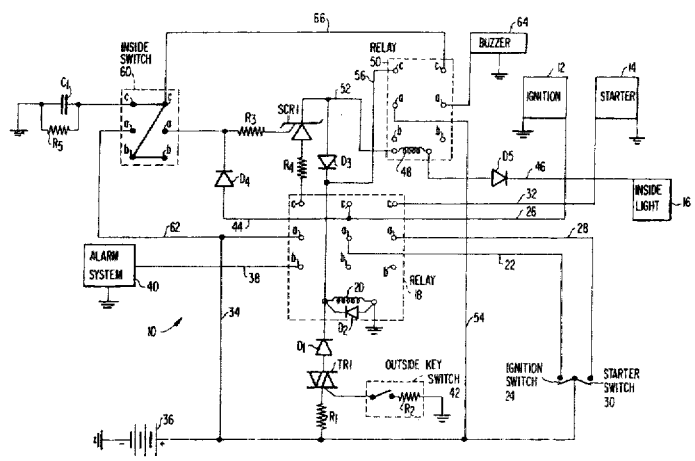

U.S. PATENT DOCUMENTS

| | | |
|---|---|---|
| 3,801,798 | 4/1974 | Atkins . |
| 3,801,799 | 4/1974 | Atkins . |
| 3,803,515 | 4/1974 | Carlson . |
| 3,824,403 | 7/1974 | McGuirk, Jr. . |
| 3,829,829 | 8/1974 | Teich . |
| 3,842,324 | 10/1974 | Atkins . |
| 3,852,614 | 12/1974 | Carlson ................................. 307/10.2 |
| 3,866,168 | 2/1975 | McGuirk, Jr. . |
| 3,868,518 | 2/1975 | Teich . |
| 3,896,620 | 7/1975 | Flory . |
| 3,927,336 | 12/1975 | Carlson et al. . |
| 3,937,976 | 2/1976 | McGuirk, Jr. et al. . |
| 3,956,732 | 5/1976 | Teich ..................................... 180/287 |
| 3,983,534 | 9/1976 | Goodman et al. . |
| 3,997,870 | 12/1976 | Horvath ................................. 340/426 |
| 4,123,745 | 10/1978 | Gurgone . |

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–13 is confirmed.

* * * * *